(12) United States Patent
Fauni

(10) Patent No.: US 6,997,438 B2

(45) Date of Patent: Feb. 14, 2006

(54) ELECTRONICALLY CONTROLLED BUTTERFLY VALVE PROVIDED WITH A FLAT LEAF SPRING AND A SPIRAL SPRING TO ESTABLISH THE LIMP-HOME POSITION

(75) Inventor: Claudio Fauni, Bologna (IT)

(73) Assignee: Magneti Marelli Powertrain S.p.A., (IT)

( * ) Notice: Subject to any disclaimer, the term of this patent is extended or adjusted under 35 U.S.C. 154(b) by 0 days.

(21) Appl. No.: 10/941,422

(22) Filed: Sep. 15, 2004

(65) Prior Publication Data

US 2005/0092956 A1 May 5, 2005

(30) Foreign Application Priority Data

Sep. 15, 2003 (IT) .......................... BO2003A0531

(51) Int. Cl.
*F16K 1/22* (2006.01)

(52) U.S. Cl. ....................... 251/305; 123/361; 123/399

(58) Field of Classification Search ................ 251/305, 251/308; 123/361, 396, 399

See application file for complete search history.

(56) References Cited

U.S. PATENT DOCUMENTS

| | | | | |
|---|---|---|---|---|
| 6,244,565 | B1 * | 6/2001 | McDonnell et al. | 251/129.12 |
| 6,286,481 | B1 | 9/2001 | Bos et al. | 123/399 |
| 6,390,062 | B1 | 5/2002 | Saito et al. | 123/399 |
| 2002/0129791 | A1 | 9/2002 | Saito et al. | 123/399 |
| 2003/0066515 | A1 | 4/2003 | Saito et al. | 123/399 |
| 2003/0196640 | A1 | 10/2003 | Saito et al. | 123/399 |

FOREIGN PATENT DOCUMENTS

| | | | |
|---|---|---|---|
| DE | 202 11 815 | U1 | 1/2003 |
| EP | 1 024 271 | A2 | 8/2000 |
| WO | WO00/68556 | A1 | 11/2000 |

OTHER PUBLICATIONS

Search Report for European Application No. EP 04 10 4444 (Dec. 8, 2004).

* cited by examiner

*Primary Examiner*—J. Casimer Jacyna
(74) *Attorney, Agent, or Firm*—Howrey LLP

(57) ABSTRACT

An electronically controlled butterfly valve comprising a valve body, a valve seat formed in the valve body, a butterfly disc adapted to engage the valve seat, a shaft on which the butterfly disc is keyed, an electric motor coupled to the shaft by means of a gear transmission having a final gear keyed on the shaft, a spiral return spring adapted to rotate the butterfly disc towards the closed position, and an opposing spring adapted to rotate the butterfly disc towards a limp-home position defined by an abutment body against the action of the return spring; the opposing spring is a flat leaf spring and is mounted on a moving member which is mounted coaxially and idly on the shaft and has a projection adapted to engage in abutment against the abutment body, an end of the opposing spring being free and ending in a projection which is disposed so as to be superimposed on the trajectory followed by a member rigid with the final gear.

10 Claims, 5 Drawing Sheets

ELECTRONICALLY CONTROLLED BUTTERFLY VALVE PROVIDED WITH A FLAT LEAF SPRING AND A SPIRAL SPRING TO ESTABLISH THE LIMP-HOME POSITION

The present invention relates to an electronically controlled butterfly valve provided with a flat leaf spring and a spiral spring to establish the limp-home position.

BACKGROUND OF THE INVENTION

Petrol driven internal combustion engines are normally provided with a butterfly valve which regulates the flow of air supplied to the cylinders. Typically, the butterfly valve comprises a valve body housing a valve seat engaged by a butterfly disc which is keyed on a shaft in order to rotate between an open position and a closed position under the action of an electric motor connected to this shaft by means of a gear transmission. The shaft bearing the butterfly valve is associated with a position sensor which is adapted to detect the angular position of the shaft and therefore of the butterfly valve in order to enable a control unit to control, by feedback, the electric motor which determines the position of the butterfly valve.

The butterfly valve normally comprises a spiral return spring which is mounted coaxially with the shaft and is mechanically coupled to the shaft in order to exert a torque on this shaft which tends to bring the shaft towards the closed position; and a spiral opposing spring which is mounted coaxially with the shaft and is mechanically coupled to the shaft in order to exert a torque on this shaft which tends to bring the shaft into a partially open position (called the limp-home position) against the action of the return spring and as a result of the presence of an abutment body which defines an abutment for the opposing spring against which the opening movement determined by this opposing spring is stopped. The torque generated by the opposing spring is greater than the torque generated by the return spring; for this reason, when the motor is not activated the shaft is disposed in the limp-home position and the motor itself then has to generate a respective drive torque both to bring the shaft into the position of maximum opening and to bring the shaft into the closed position.

US20020129791 discloses a throttle device for an internal-combustion engine, in which, on one side of the side wall of a throttle body, there are formed a space for mounting a reduction gear mechanism which transmits the power from a motor to a throttle valve shaft and a default opening setting mechanism for holding a throttle valve opening at a specific opening (default opening) when the ignition switch is in off position, and a gear cover mounting frame which edges the mounting space; the frame is formed lower than the mounting level of the reduction gear mechanism. A gear cover for covering the gear mounting space is attached on the frame; a stopper for defining the default opening and a stopper for defining the full-closed position of the throttle valve are juxtaposed so as to enable position adjustments in the same direction. These stoppers serve to stop a default lever and a throttle gear, thereby enabling downsizing, weight reduction, and rationalization of fabrication and adjustments of an electronically controlled throttle device.

The solution described above in which the limp-home position is established by two spiral springs is normally used in the butterfly valves available commercially; however, this solution has some drawbacks as it is very bulky and relatively complex and time-consuming to assemble.

SUMMARY OF THE INVENTION

The object of the present invention is to provide an electronically controlled butterfly valve provided with a flat leaf spring and a spiral spring to establish the limp-home position which is free from the drawbacks described above and which is, in particular, simple and economic to embody.

The present invention therefore relates to an electronically controlled butterfly valve comprising a valve body, a valve seat formed in the valve body, a butterfly disc adapted to engage the valve seat, a shaft on which the butterfly disc is keyed, an electric motor coupled to the shaft by means of a gear transmission having a final gear keyed on the shaft in order to rotate the butterfly disc between a position of maximum opening and a closed position of the valve seat, a spiral return spring adapted to rotate the butterfly disc towards the closed position, and an opposing spring adapted to rotate the butterfly disc towards a partially open or limp-home position defined by an abutment body against the action of the return spring, the butterfly valve being characterised in that the opposing spring is a flat leaf spring and is mounted on a moving member which is mounted coaxially and idly on the shaft and has a projection adapted to engage in abutment against the abutment body, an end of the opposing spring being free and ending in a projection which is disposed so as to be superimposed on the trajectory followed by a member rigid with the final gear.

BRIEF DESCRIPTION OF THE DRAWINGS

The present invention is described below with reference to the accompanying drawings which show a non-limiting embodiment thereof, and in which.

DETAILED DESCRIPTION OF THE INVENTION

Figure 1:
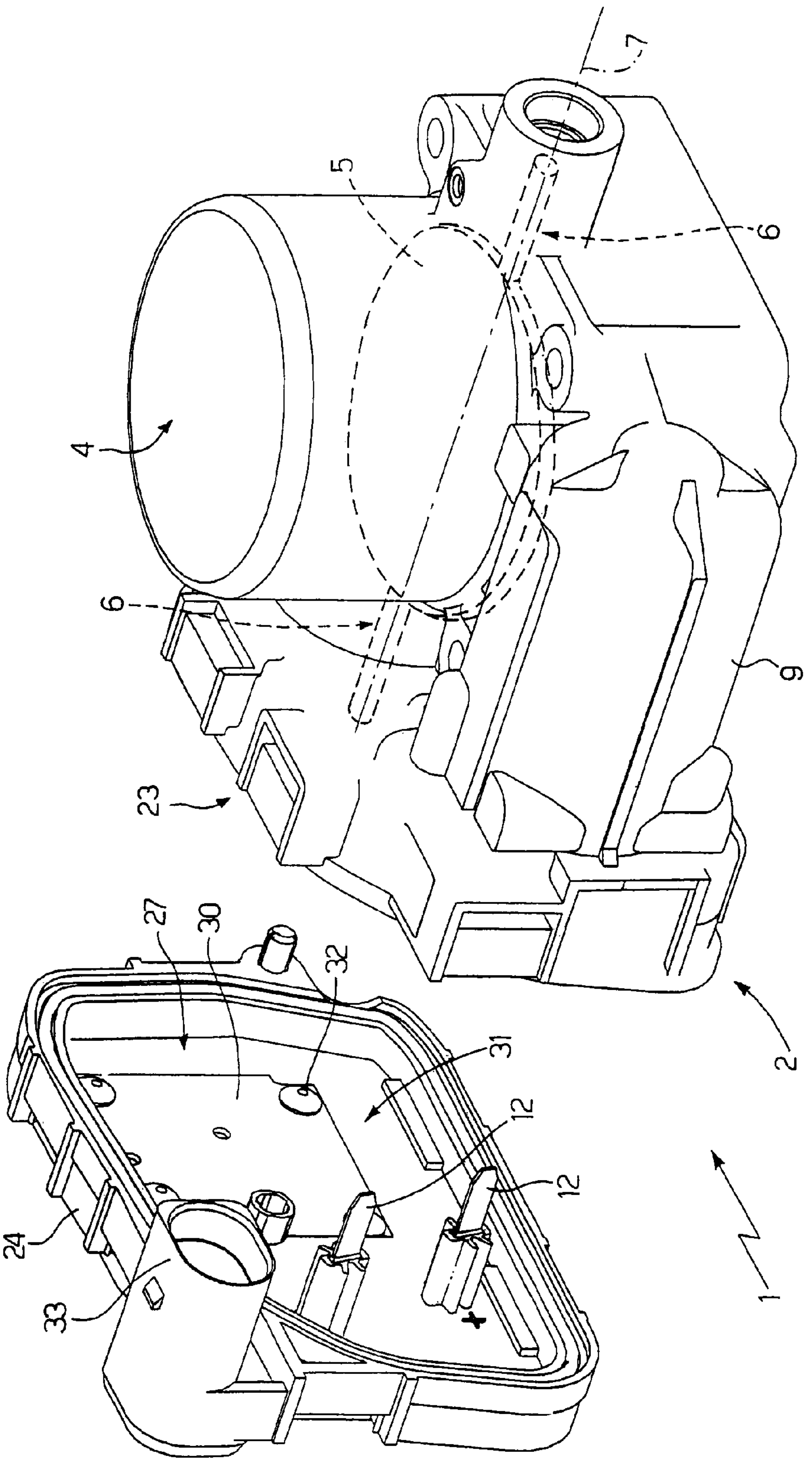
FIG. 1 is a perspective view, partially exploded and with some parts removed for clarity, of a butterfly valve produced in accordance with the method of the present invention.
Figure 2:
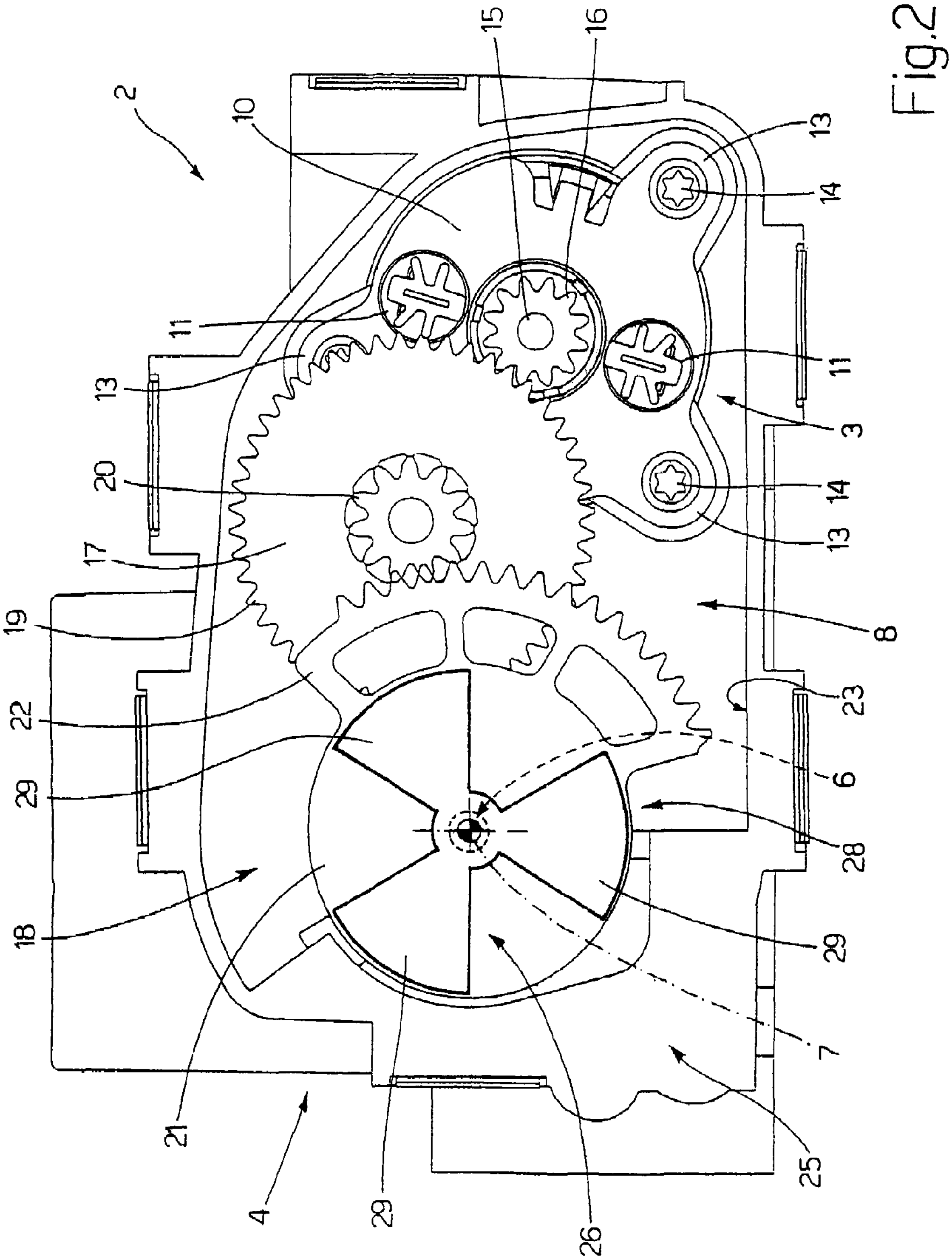
FIG. 2 is a front, diagrammatic view of a chamber of a valve body of the butterfly valve of FIG. 1.

In FIG. 1, an electronically controlled butterfly valve for an internal combustion engine (not shown) is shown overall by 1; the butterfly valve 1 comprises a metal valve body 2 housing an electric motor 3 (shown in FIG. 2), a valve seat 4 and a butterfly disc 5 (shown diagrammatically in dashed lines) which engages the valve seat 4 and is displaced between an open position and a closed position under the action of the electric motor 3. As shown in FIG. 2, the butterfly disc 5 is in particular keyed on a metal shaft 6 having a longitudinal axis 7 in order to rotate between the open position and the closed position under the action of the electric motor 3 connected to this shaft 6 by means of a gear transmission 8 (shown in FIG. 2).

As shown in FIG. 2, the electric motor 3 has a cylindrical body which is disposed in a tubular housing 9 (shown in FIG. 1) disposed alongside the valve seat 4 and is held in a predetermined position within this tubular housing 9 by a metal plate 10; the metal plate 10 comprises a pair of female electrical connectors 11 which are electrically connected to the electric motor 3 and are adapted to be engaged by a pair of respective male electrical connectors 12 (shown in FIG.

1). In order to ensure that the electric motor 3 is correctly secured to the valve body 2, the plate 10 has three radial drilled projections 13 via which respective screws 14 for fastening to the valve body 2 are inserted.

The electric motor 3 comprises a shaft 15 ending in a toothed wheel 16 which is mechanically connected to the shaft 6 by means of an idle toothed wheel 17 interposed between the toothed wheel 16 and a final gear 18 keyed on the shaft 6. The toothed wheel 17 comprises a first set of teeth 19 coupled to the toothed wheel 16 and a second set of teeth 20 coupled to the final gear 18; the diameter of the first set of teeth 19 differs from the diameter of the second set of teeth 20 with the result that the toothed wheel 17 has a transmission ratio which is not unitary. The final gear 18 is formed by a solid central cylindrical body 21 keyed on the shaft 6 and provided with a circular crown portion 22 provided with a set of teeth coupled to the toothed wheel 17. The whole gear transmission 8, i.e. the toothed wheel 16, the toothed wheel 17 and the final gear 18 are normally made from plastics material.

The gear transmission 8 and the plate 10 are disposed in a chamber 23 of the valve body 2 which is closed by a detachable cover 24 (shown in FIG. 1) made from plastics material.

As shown in FIGS. 1 and 2, the butterfly valve 1 comprises an inductive position sensor 25 of the "contact-free" type which is coupled to the shaft 6 and is adapted to detect the angular position of the shaft 6 and, therefore, of the butterfly disc 5 in order to enable the control, in feedback, of the position of this butterfly disc 5. The position sensor 25 is of the type disclosed in U.S. Pat. No. 6,236,199-B1 and comprises a rotor 26 rigid with the shaft 6 and a stator 27 borne by the cover 24 and disposed in operation to face the rotor 26; the rotor 26 is formed by a plane metal winding 28 which is closed in short-circuit, comprises a series of lobes 29 and is embedded in the central cylindrical body 21 of the final gear 18. The metal winding 28 is preferably partially embedded in the central cylindrical body 21 of the final gear 18 so that a surface of the winding 28 facing the stator 27 is substantially coplanar with an outer surface of the cylindrical body 21. According to a different embodiment (not shown), the metal winding 28 is completely embedded in the central cylindrical body 21 of the final gear 18. The stator 27 of the position sensor 25 comprises a support base 30 which is connected to an inner wall 31 of the cover 24 by means of four plastic rivets 32.

As shown in FIG. 1, the cover 24 is provided with a female electrical connector 33 which comprises a series of electrical contacts (not shown in detail): two electrical contacts are connected to the male electrical connectors 12 adapted to supply the electric motor 3, while the other four electrical contacts are connected to the stator 27 of the position sensor 25; when the cover 24 is disposed in contact with the valve body 2 to close the chamber 23, the female electrical connector 33 is disposed above the tubular housing 9 of the electric motor 3.

Figure 3:
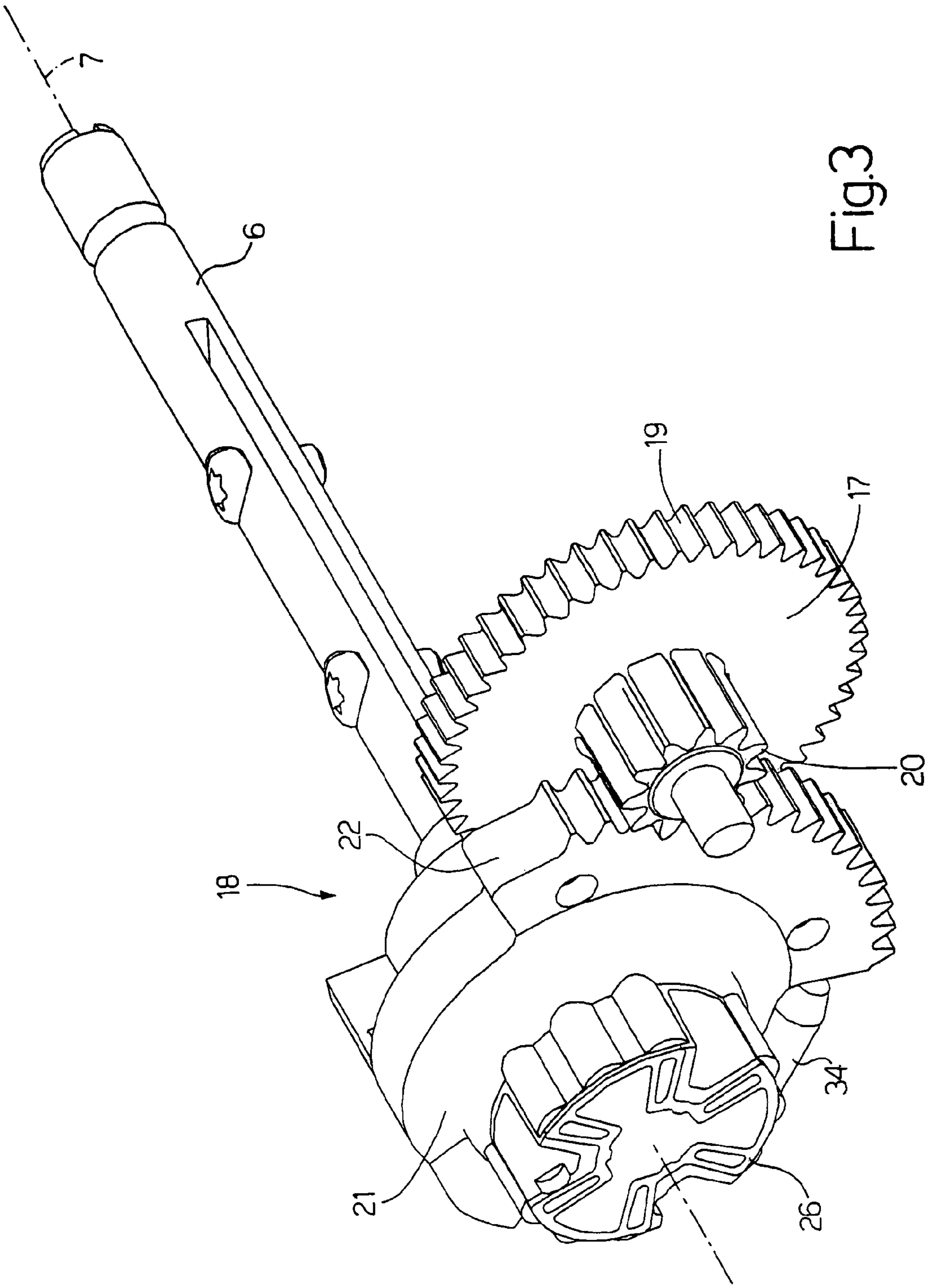
FIGS. 3 and 4 are perspective views, on an enlarged scale, of a detail of the butterfly valve of FIG. 1.
Figure 4:
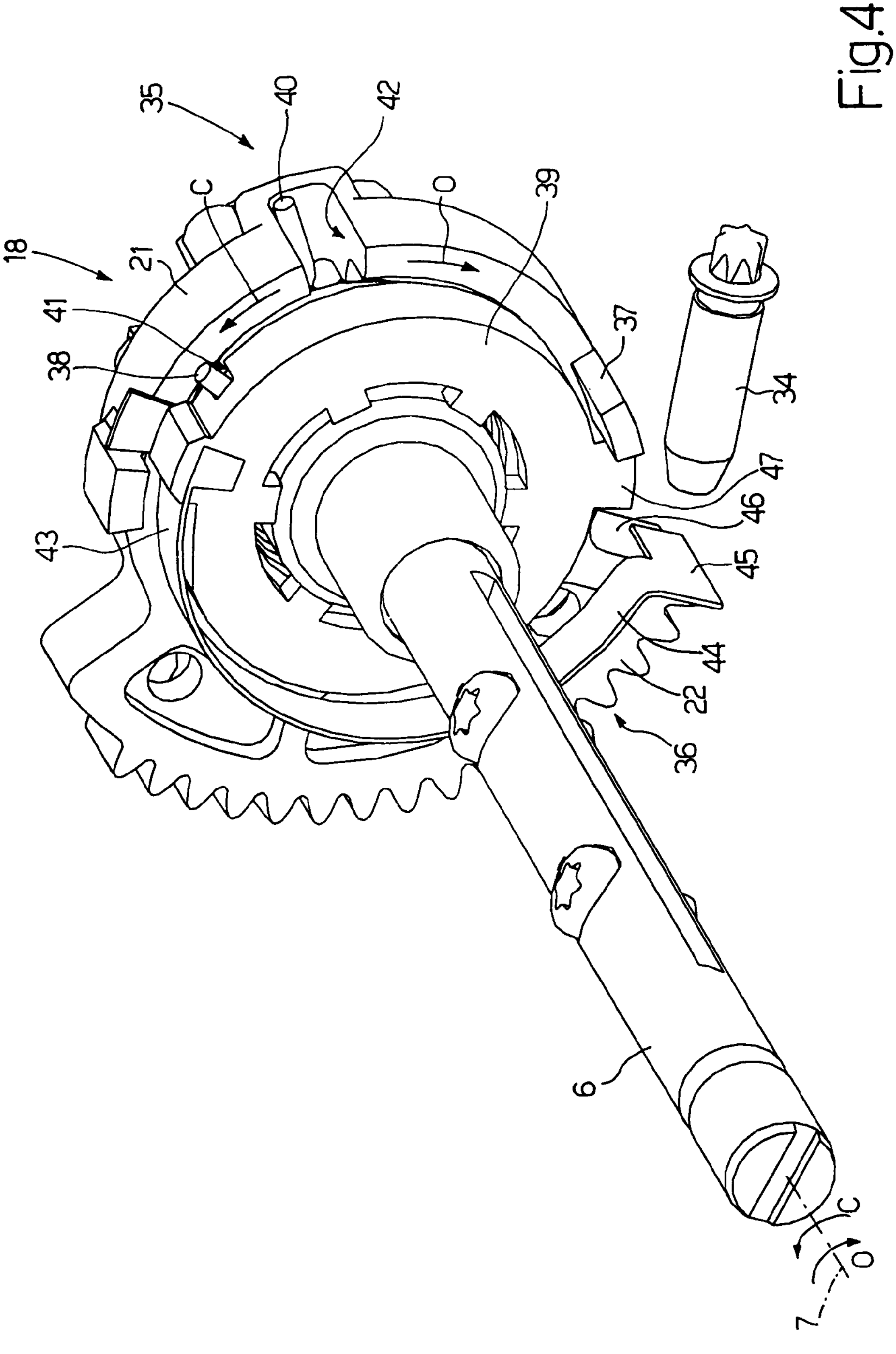
Figure 5:
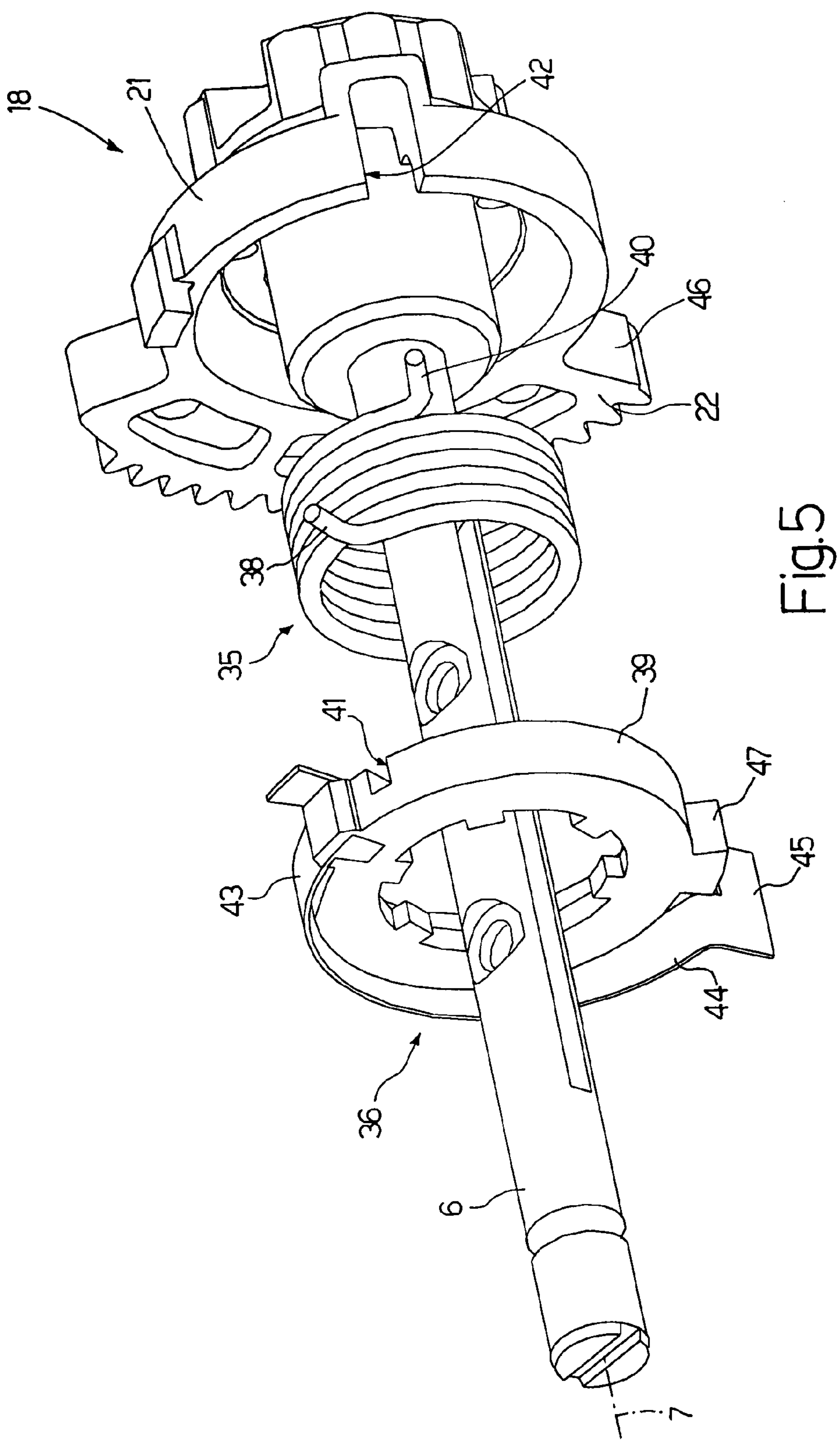
FIG. 5 is an exploded perspective view of the detail of FIGS. 3 and 4.

As shown in FIGS. 2, 3 and 4, an idling screw 34 is provided, is adapted to prevent jamming of the butterfly disc 5 and cooperates with the circular crown portion 22 of the final gear 18; when the shaft 6 is brought by the action of the electric motor 3 into the closed position, the rotation of the shaft 6 is not stopped by the impact between the butterfly disc 5 and the walls of the valve body 4, but is stopped by the impact of the circular crown portion 22 of the final gear 18 against the idling screw 34. This solution is necessary because any impact between the butterfly disc 5 and the walls of the valve body 4 could cause wedging of the butterfly disc 5 with respect to the walls of the valve body 4 and therefore jamming of the butterfly valve 1. During the production stage of the butterfly body 1, the axial position of the idling screw 34 may be adjusting by screwing or unscrewing this idling screw 34 with respect to the valve body 4; the position of the idling screw 34 may then be locked with respect to the valve body 2 in order to prevent any subsequent kind of displacement (typically as a result of the vibrations generated in use by the engine).

As shown in FIG. 4, the butterfly valve 1 comprises a return spring 35 which is a spiral torsion spring (i.e. the spring is deformed by a circular displacement generating a resistant torque) and tends to rotate the shaft 6 in the anti-clockwise direction with reference to FIG. 4 (arrow C) with a movement which tends to bring the butterfly disc 5 towards the closed position; the butterfly valve 1 also comprises an opposing spring 36 which is a flat leaf spring and tends to rotate the shaft 6 in the clockwise direction with reference to FIG. 3 (arrow O) with a movement which tends to bring the butterfly disc 5 towards an open position. The return spring 35 generates a smaller torque than the torque generated by the opposing spring 36 with the result that, overall, the combination of the effects of the return spring 35 and the opposing spring 36 tends to rotate the shaft 6 in a clockwise direction with reference to FIG. 4 (arrow O) towards an open position of the butterfly disc 5.

The rotation in the clockwise direction with reference to FIG. 4 (arrow O) towards the open position of the shaft 6 under the action of the return spring 35 and opposing spring 36 stops at a partially open or limp-home position; in this way, in the absence of the action of the electric motor 3, the shaft 6 (and therefore the butterfly disc 5) is disposed in the limp-home position. When the electric motor 3 is actuated, the drive torque generated by this electric motor 3 is able to rotate the shaft 6 (and therefore the butterfly disc 5) into a completely closed position against the torque generated by the opposing spring 36 and is able to rotate the shaft 6 (and therefore the butterfly disc 5) into a position of maximum opening against the torque generated by the return spring 23. In particular, and as described in detail below, the limp-home position is defined by an abutment body 37 which is provided on the valve body 2.

The return spring 35 has an end 38 connected mechanically to a cylindrical moving member 39 which is mounted coaxially and idly on the shaft 6, i.e. there are no direct mechanical connections between the shaft 6 and the member 39. An end 40 of the return spring 35 opposite the end 38 is mechanically connected to the final gear 18; the moving member 39 is provided with a seat 41 adapted to house the end 38 of the return spring 35 and the final gear 18 is provided with a seat 42 adapted to house the end 40 of the return spring 35.

The opposing spring 36 is mounted on the moving member 39; in particular, an end 43 of the opposing spring 36 is rigid with the moving member 39 and an end 44 of the opposing spring 36 opposite the end 43 is free and ends in a projection 45 which is disposed so that it is superimposed on the trajectory followed by a lateral wall 46 of the circular crown portion 22 of the final gear 18.

The moving member 39 further comprises a projection 47 projecting radially from this moving member 39 in order to engage in abutment against the abutment body 37 of the valve body 2 as shown in FIG. 4.

In the absence of the action of the electric motor 3, the torque generated by the return spring 35 rotates the shaft 6 and therefore the final gear 18 in an anti-clockwise direction with reference to FIG. 4 (arrow C) with a movement which tends to bring the butterfly disc 5 towards the closed position; at a certain point, the lateral wall 46 of the circular crown portion 22 of the final gear 18 bears on the projection 45 of the opposing spring 36, as shown in FIG. 4, causing the opposing spring 36 and therefore the moving member 39 to rotate in a clockwise direction with reference to FIG. 4 (arrow C) until the projection 47 of the moving member 39 bears on the abutment body 37 of the valve body 2 as shown in FIG. 4. At this point, the subsequent rotation of the shaft 6 and therefore of the final gear 18 in the anti-clockwise direction with respect to FIG. 4 (arrow C) deforms the opposing spring 36 which, by feedback, generates a resistant torque which balances the torque generated by the return spring 35 and causes the shaft 6 to stop in the limp-home position.

In the embodiment shown in FIG. 4, it is necessary to modify the position of the abutment body 37 to regulate the value of the air flow in the limp-home position; however, this operation is not simple as the abutment body 37 is obtained directly on the valve body 2.

According to an alternative embodiment (not shown), the abutment body 37 is formed by an abutment screw screwed into the valve body 2; in this way, it is extremely simple to regulate the value of the air flow in the limp-home position by screwing or unscrewing the abutment screw with respect to the valve body 2. During the production stage, the butterfly valve 1 is in particular disposed in a test station (known and not shown) in which the value of the air flow in the limp-home position is measured in real time; in these conditions, the axial position of the abutment screw 37 with respect to the valve body 2 is regulated by screwing or unscrewing the abutment screw until the desired value of the air flow in the limp-home position is accurately obtained. Preferably, once the axial position of the abutment screw with respect to the valve body 2 has been set, the abutment screw is locked with respect to the valve body 2 to prevent any subsequent kind of displacement (typically as a result of the vibrations generated in use by the engine).

It should be noted that the unit formed by the shaft 6, the return spring 35 and the moving member 39 provided with the return spring 36 may be pre-assembled separately and inserted by means of a single assembly operation, which may be automated, in the valve body 2.

In comparison with the conventional solution in which the return and opposing springs are both spiral springs, the solution for the butterfly valve 1 as described above in which the return spring 35 is a spiral spring and the opposing spring 36 is a flat leaf spring has various advantages as it enables a reduction of friction and bulk, is more reliable and makes it possible to reduce assembly times.

What is claimed is:

1. An electronically controlled butterfly valve (1) comprising a valve body (2), a valve seat (4) formed in the valve body (2), a butterfly disc (5) adapted to engage the valve seat (4), a shaft (6) on which the butterfly disc (5) is keyed, an electric motor (3) coupled to the shaft (6) by means of a gear transmission (8) having a final gear (18) keyed on the shaft (6) in order to rotate the butterfly disc (5) between a position of maximum opening and a closed position of the valve seat (4), a spiral return spring (35) adapted to rotate the butterfly disc (5) towards the closed position, and an opposing spring (36) adapted to rotate the butterfly disc (5) towards a partially open or limp-home position defined by an abutment body (37) against the action of the return spring (35), the butterfly valve (1) being characterised in that the opposing spring (36) is a flat leaf spring and is mounted on a moving member (39) which is mounted coaxially and idly on the shaft (6) and has a projection (47) adapted to engage in abutment against the abutment body (37), an end (44) of the opposing spring (36) being free and ending in a projection (45) which is disposed so as to be superimposed on the trajectory followed by a member (46) rigid with the final gear (18).

2. A butterfly valve (1) as claimed in claim 1, in which the final gear (18) is formed by a solid central cylindrical body (21) keyed on the shaft (6) and provided with a circular crown portion (22) provided with a set of teeth, the projection (45) of the opposing spring (36) being disposed so as to be superimposed on the trajectory followed by a lateral wall (46) of the circular crown portion (22) of the final gear (18).

3. A butterfly valve (1) as claimed in claim 1, in which the gear transmission (8) comprises a first toothed wheel (16) rigid with a shaft (15) of the electric motor (3) and a second toothed wheel (17) which is mounted idly on the valve body (2) and is interposed between the first toothed wheel (16) and the final gear (18).

4. A butterfly valve (1) as claimed in claim 3, in which the second toothed wheel (17) has a first set of teeth (19) coupled to the first toothed wheel (16) and a second set of teeth (20) coupled to the final gear (18), the diameter of the first set of teeth (19) differing from the diameter of the second set of teeth (20).

5. A butterfly valve (1) as claimed in claim 1, comprising an idling screw (34), whose function is to prevent jamming of the butterfly disc (5), which is screwed into the valve body (2) and cooperates with the final gear (18).

6. A butterfly valve (1) as claimed in claim 1, in which the return spring (35) has a first end (38) mechanically connected to the moving member (39) and a second end (40) of the return spring (35) opposite the end (38) mechanically connected to the final gear (18).

7. A butterfly valve (1) as claimed in claim 6, in which the moving member (39) is provided with a first seat (41) adapted to house the first end (38) of the return spring (35) and the final gear (18) is provided with a second seat (42) adapted to house the second end (40) of the return spring (35).

8. A butterfly valve as claimed in claim 1, in which the projection (47) of the moving member (39) projects radially from this moving member (39).

9. A butterfly valve (1) as claimed in claim 1, in which the abutment body (37) is obtained directly in the valve body (2).

10. A butterfly valve (1) as claimed in claim 1, in which the abutment body (37) is formed by an abutment screw screwed into the valve body (2).

* * * * *